Jan. 30, 1945.  B. REISTAD  2,368,493
REFRIGERATION
Filed Nov. 25, 1941
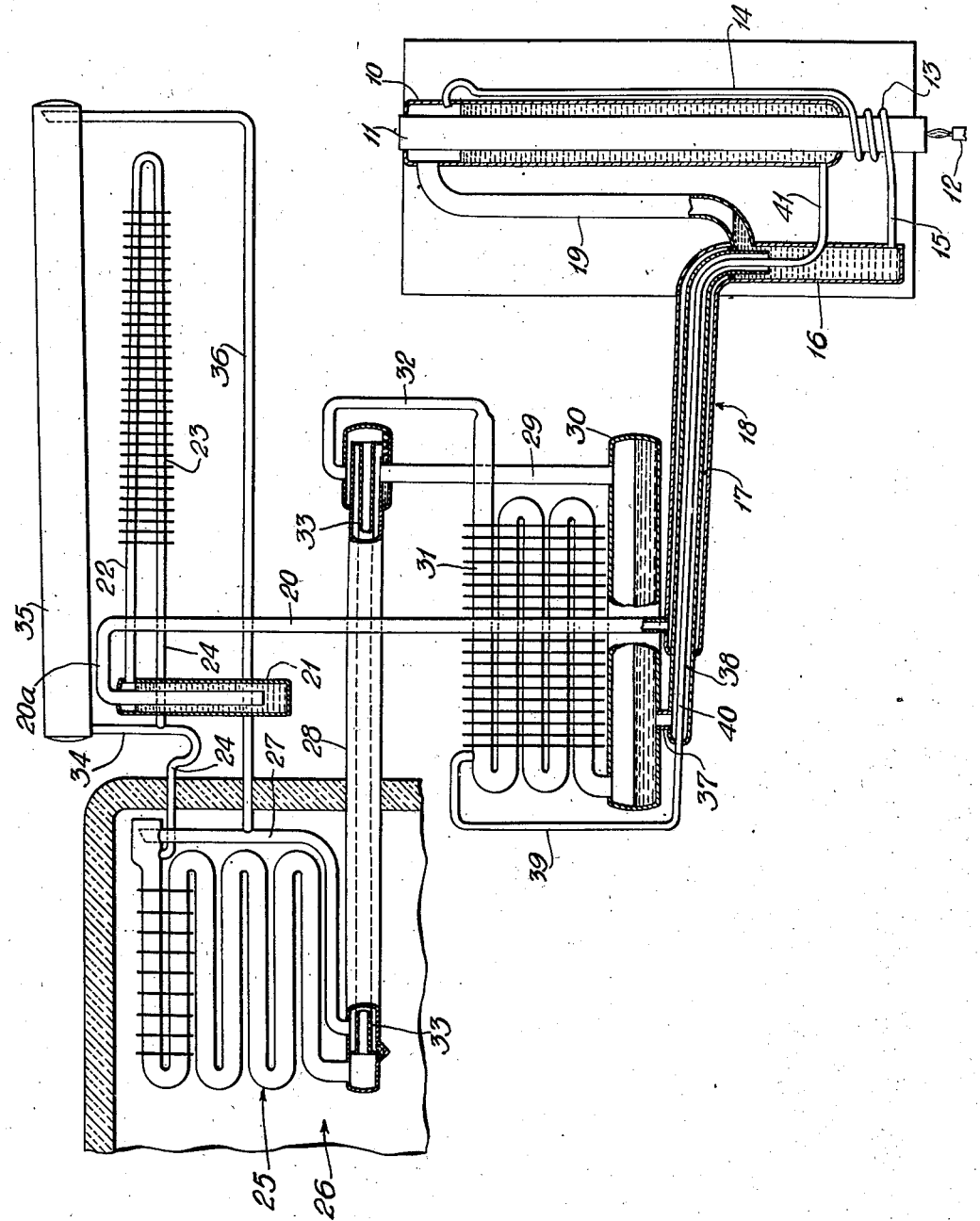
INVENTOR
Bengt Reistad
BY
D.E. Heath
his ATTORNEY Patented Jan. 30, 1945

2,368,493

UNITED STATES PATENT OFFICE 2,368,493

REFRIGERATION

Bengt Reistad, Stockholm, Sweden

Application November 25, 1941, Serial No. 420,352
In Germany December 7, 1940

4 Claims. (Cl. 62—119.5)

My invention relates to refrigeration, and more particularly to refrigeration systems employing evaporation of refrigerant fluid in the presence of an auxiliary inert fluid.

It is an object of the invention to provide a refrigeration system of this type in which circulation of an absorption liquid is carried out by vapor lift action and generated vapors are rectified by heat transfer out of physical contact with the absorption liquid below the surface level of liquid in the absorption liquid circuit, the contact being prevented by pressure of the vapor as will be more fully understood upon reference to the following description in connection with the accompanying drawing in which the single figure shows more or less diagrammatically a refrigeration system embodying the invention.

A generator 10 has a heating flue 11 into the lower end of which is directed the flame of a gas burner 12. Around the lower part of flue 11 and in heat exchange relation therewith there is a pipe coil 13. The upper end of coil 13 is connected by a vapor lift conduit 14 to the upper part of generator 10. The lower end of coil 13 is connected by a conduit 15 to the lower end of a pipe 16. The upper end of pipe 16 is connected to one end of the outside passage 17 of a triple heat exchanger 18. The top of generator 10 is connected by a conduit 19 to the upper end of pipe 16. Pipe 16 may be a downturned extension of the outside tube of the heat exchanger 18, as shown.

The other end of passage 17 of the heat exchanger 18 is connected by a conduit 20, a liquid trap 21, and a conduit 22 to the upper end of an air cooled condenser 23. The lower end of condenser 23 is connected by a conduit 24 to the upper part of an evaporator coil 25 located in a refrigerator storage compartment 26. The liquid trap 21 is formed by a vessel connected at its top by conduit 22 to the condenser 23. Conduit 20 has an upward loop 20a of which one leg is connected to the heat exchanger 18, and the other leg projects downward into the lower part of vessel 21.

The upper end of evaporator coil 25 is connected by a conduit 27, a gas heat exchanger 28, and a conduit 29 to a vessel 30. The lower end of an absorber coil 31 is connected to vessel 30. The upper end of absorber coil 31 is connected by a conduit 32, gas heat exchanger 28, and conduit 33 to the lower end of evaporator coil 25.

The lower end of condenser 23 is connected by a part of conduit 24, a conduit 34, a vessel 35, and a conduit 36 to conduit 27 in the evaporator-absorber circuit.

The bottom of vessel 30 is connected by a conduit 37, and the intermediate passage 38 of the heat exchanger 18, to the upper part of pipe 16. The conduit forming passage 38 projects downward and is open in the upper part of pipe 16. The upper end of absorber coil 31 is connected by a conduit 39, the inner passage 40 of heat exchanger 18, and a conduit 41 to the lower part of generator 10. In the drawing the conduit 39, heat exchanger passage 40, and conduit 41 are shown as a single pipe.

The system just described is evacuated and charged with a solution of refrigerant fluid in an absorption liquid such as, for instance, a thirty per cent solution of ammonia in water, and an auxiliary pressure equalizing fluid such as hydrogen gas which is charged into the system at a pressure such that the total pressure in the system will be the condensing pressure of ammonia at a fairly high room temperature.

Operation of the system is caused by lighting the burner 12. Operation of the burner 12 may be thermostatically controlled responsive to a temperature condition affected by the evaporator 25, as known. The burner 12 by way of flue 11 causes heating of liquid in pipe coil 13 and generator 10. Heating of liquid in these parts causes expulsion of ammonia vapor from solution. Vapor expelled from solution in coil 13 rises through conduit 14 raising therewith liquid into the upper part of generator 10. The level of liquid rises in generator 10 until it reaches the level of the connection of conduit 39 to the upper end of absorber coil 31 whereupon liquid flow takes place through the remainder of the absorption liquid circuit by gravity. The liquid flows from the bottom of generator 10 through conduit 41, heat exchanger 18, and conduit 39 into the upper end of absorber coil 31. The liquid flows downward through absorber coil 31 absorbing ammonia vapor out of the atmosphere in the absorber. Enriched absorption liquid flows from the lower end of coil 31 into vessel 30 and thence through conduit 37, heat exchanger 18, pipe 16, and conduit 15 to the coil 13.

Vapor expelled from solution in liquid in generator 10 rises through the liquid in the generator and flows from the top of the generator through conduit 19 into the upper part of pipe 16. Vapor in generator 10 and conduit 19 depresses the surface level of liquid in conduit 19 so that the vapor bubbles through liquid in the upper part of pipe 16 and enters the outer passage 17 of the heat exchanger 18. Vapor flows from heat exchanger 18 through conduit 20, vessel 21, and conduit 22 to the condenser 23. Vapor in conduit 20 depresses the surface level of liquid in the leg of this conduit connected to vessel 21 so that vapor bubbles from the end of conduit 20 upward through liquid in vessel 21. The pressure of vapor in conduit 20 above that in the rest of the system is the weight of the column of liquid from the end of conduit 20 in the bottom of vessel 21 to the surface level of liquid in the vessel 21. This vapor pressure causes depression of the surface level of liquid in heat exchanger 18 and the upper end of pipe 16 below the surface vel of liquid in absorber vessel 30 a distance substantially equal to the height of said liquid column in vessel 21. This depression of liquid keeps the outer heat exchanger passage 17 clear of liquid so that vapor therein is in heat exchange relation out of physical contact with liquid flowing in the intermediate heat exchanger passage 38. This heat exchange causes condensation of water vapor in passage 17 and the condensate flows by gravity to the absorption liquid circuit by way of the upper end of pipe 16.

Refrigerant vapor condenses to liquid in condenser 23. The liquid flows through conduit 24 into the upper end of evaporator 25. The liquid flows downward in evaporator coil 25, evaporating and diffusing into the atmosphere in the evaporator. The evaporation of liquid produces a refrigeration effect for cooling the refrigerator compartment 26.

The resulting mixture of hydrogen gas and refrigerant vapor flows from the upper end of evaporator coil 25 through conduit 27, heat exchanger 28, and conduit 29 to absorber vessel 30. The mixture flows from vessel 30 upward through absorber coil 31 in which the refrigerant vapor is absorbed into solution as described. Weak gas flows from the upper end of absorber coil 31 through conduit 32, heat exchanger 28, and conduit 33 back to the evaporator 25.

Any non-condensible gas such as hydrogen which finds its way to the condenser 23 escapes from the condenser through conduit 24, conduit 34, vessel 35, and conduit 36 to the gas circuit. Any uncondensed ammonia vapor from condenser 23 flows through conduit 34 into vessel 35 and displaces gas from this storage vessel through conduit 36 into the gas circuit so that the pressure in the system rises until complete condensation of ammonia vapor takes place in the condenser 23.

Various changes and modifications may be made within the scope of the invention as set forth in the following claims.

What is claimed is:

1. An absorption refrigeration system having a circuit for inert gas, a circuit for absorption liquid including a generator and an absorber and in which liquid is caused to circulate by vapor lift action, a rectifier for refrigerant vapor located beneath the surface levels of liquid in said generator and said absorber arranged to be cooled by liquid in said circuit and communicating with said circuit for drainage of condensate from the rectifier into the circuit, and a conduit for conducting vapor from said rectifier, said conduit forming a liquid column forming trap arranged to impose a resistance to vapor flow such that the necessary vapor pressure to overcome such resistance is sufficient to bar entrance of liquid from said circuit into said rectifier.

2. An absorption refrigeration apparatus having a gas circuit including an evaporator and an absorber, an absorption liquid circuit including a generator and said absorber, a vapor lift for causing flow of absorption liquid in said absorption liquid circuit, a condenser connected to deliver liquid refrigerant to said evaporator, a conduit for vapor from said generator to said condenser including a rectifier in heat exchange with a part of said absorption liquid circuit and located below the surface levels of liquid in said generator and said absorber, and a liquid trap, said rectifier being in open communication with said circuit for flow by gravity of condensate from said rectifier into said circuit, and said liquid trap being arranged to impose such resistance to vapor flow that vapor pressure sufficient to overcome such resistance is also sufficient to exclude entrance of liquid from said absorption liquid circuit into said rectifier.

3. A refrigeration system making use of a pressure equalizing fluid and having an absorption liquid circuit including a generator and an absorber and in which flow of liquid is caused by vapor lift action, a heat exchanger located below the surface levels of liquid in said generator and said absorber, said heat exchanger having a part in which refrigerant vapor flows, and another part included in said absorption liquid circuit, so that refrigerant vapor in said first part flows in heat exchange with liquid in said circuit, said first part communicating with said absorption liquid circuit for flow of condensate from the vapor into the liquid circuit, a liquefier, a conduit for vapor from said first heat exchanger part to said liquefier, said conduit including a liquid trap for resisting flow of vapor through said conduit so that the pressure of vapor in said first heat exchanger part is sufficient to keep the surface level of liquid out of said first part.

4. A refrigeration system employing an auxiliary inert fluid for pressure equalization and having an absorption liquid circuit including an absorber, a generator, a heat exchanger located below the surface levels of liquid in said absorber and said generator, and a vapor lift for causing circulation of liquid in the circuit, said heat exchanger having a passage not included in said absorption liquid circuit but in open communication therewith, a condenser, and a conduit for conducting vapor from said generator to said condenser including said heat exchanger passage and a liquid trap, said liquid trap being arranged to require an over pressure of vapor in the part of said conduit which includes said heat exchanger passage so that liquid from said circuit is prevented from entering said passage.

BENGT REISTAD.